United States Patent [19]
Shiba

[11] Patent Number: 5,911,380
[45] Date of Patent: Jun. 15, 1999

[54] PAPER MAGAZINE FOR CONTAINING A RECORDING PAPER ROLL

[75] Inventor: Kenichi Shiba, Saitama, Japan

[73] Assignee: Fuji Photo Film Co., Ltd., Kanagawa, Japan

[21] Appl. No.: 09/064,182

[22] Filed: Apr. 22, 1998

[30] Foreign Application Priority Data

Apr. 22, 1997  [JP]  Japan .................................. 9-104063

[51] Int. Cl.⁶ .................................................. G03B 17/26
[52] U.S. Cl. .................. 242/348; 242/348.3; 242/348.4; 242/332.5
[58] Field of Search ................................ 242/332.5, 348, 242/348.2, 348.3, 348.4, 562, 588.5; 396/516, 538

[56] References Cited

U.S. PATENT DOCUMENTS

| | | | |
|---|---|---|---|
| 3,488,016 | 1/1970 | Mouissie | 242/332.5 |
| 3,519,218 | 7/1970 | Mees | 242/562 |
| 3,655,145 | 4/1972 | Olsen | 242/348.2 |
| 3,664,606 | 5/1972 | Riedel | 242/332.5 |
| 3,670,989 | 6/1972 | Andrews | 242/348 |
| 3,691,921 | 9/1972 | Isbell | 242/348 |
| 3,733,036 | 5/1973 | Eitzenberger | 242/332.5 |
| 4,765,561 | 8/1988 | Kaps | 242/332.5 |
| 4,787,513 | 11/1988 | Auble et al. | 242/348.4 |
| 5,014,929 | 5/1991 | Kato et al. | 242/348.3 |
| 5,092,535 | 3/1992 | Murata et al. | 242/348.3 |
| 5,249,754 | 10/1993 | Liermann et al. | 242/562 |
| 5,354,009 | 10/1994 | Buelens et al. | 242/348.4 |
| 5,659,833 | 8/1997 | Fitzgerald | 242/348.4 |
| 5,748,290 | 5/1998 | Nakao | 242/348 |

FOREIGN PATENT DOCUMENTS

| | | | |
|---|---|---|---|
| 1 280 049 | 10/1968 | Germany | 242/332.5 |
| 1 287 437 | 1/1969 | Germany | 242/332.5 |
| 1 288 910 | 2/1969 | Germany | 242/332.5 |

*Primary Examiner*—John P. Darling
*Attorney, Agent, or Firm*—Sughrue, Mion, Zinn, Macpeak & Seas, PLLC

[57] ABSTRACT

A magazine body constituting a paper magazine is provided with a paper mouth through which a recording paper is advanced. Behind the paper mouth, a separating plate having a thin thickness and formed from plastic is disposed. The separating plate contacts a periphery of a recording paper roll contained in the paper magazine. The recording paper roll is rotated in a paper advancing direction by a drive roller. Upon rotation of the recording paper roll, the separating plate contacting the periphery of the recording paper roll separates a top of the recording paper from the recording paper roll. After that, the separating plate leads the top of the recording paper to the paper mouth. The recording paper is advanced to the outside of the paper magazine through the paper mouth.

22 Claims, 9 Drawing Sheets

PAPER MAGAZINE FOR CONTAINING A RECORDING PAPER ROLL

BACKGROUND OF THE INVENTION

1. Field of the Invention

The present invention relates to a paper magazine for containing a recording paper roll of a thermal recording paper, a photographic paper and so forth. The paper magazine is removably set in a printer.

2. Description of the Related Art

As to printers, there are many types. In one type of the printer, a sheet-like recording paper which is cut in a predetermined size beforehand is used. In another type of the printer, a strip-like recording paper which is wound in a roll state is used. This strip-like recording paper is cut in a prescribed size after printing. With respect to a photo printer or a color thermal printer using a recording paper roll, a photographic paper or a color thermal recording paper constituting this recording paper roll has photosensitivity and optical fixing property. Thus, the recording paper roll is contained in the paper magazine having light shielding ability and moisture retention ability. This paper magazine containing the recording paper roll is set in the printer.

The above paper magazine is constituted of a magazine body made of a material having moisture retention property and light shielding property, and a magazine lid for opening and closing an opening through which the recording paper roll is inserted and removed. Further, the magazine body is provided with a roll rotating mechanism for rotating the recording paper roll by means of a drive unit of the printer, and a paper mouth from which a top of the recording paper is drawn out. This paper magazine is set into the printer in a state that the top of the recording paper of the recording paper roll contained in the magazine body is slightly drawn out from the paper mouth. The top of the recording paper drawn out from the paper mouth is nipped by, for example, conveyor rollers of the printer. With this, preparation for printing is over.

Such setting of the paper magazine into the printer is troublesome. Thus, in the paper magazine described in U.S. patent application Ser. No. 08/895,498 (filed on Jul. 16, 1997 and corresponding to Japanese Patent Laid-Open Publication No. 10-29356), a mechanism for advancing the recording paper comprising a belt and a rollers is provided. The top of the recording paper is adapted to be automatically advanced out of the paper magazine set in the printer.

However, in most cases, the top of the recording paper comes into contact with a peripheral surface of the recording paper roll closely. Moreover, the color thermal recording paper and the photographic paper are comparatively thick and have a certain degree of hardness. In this case, there arises a problem in that the top of the recording paper is sometimes not advanced from the paper mouth, although the recording paper roll is rotated. Further, even if the top of the recording paper is separated from the periphery of the recording paper roll, sometimes, the top of the recording paper is not properly led to the paper mouth. At this time, the top of the recording paper is caught on vicinity of the paper mouth. Accordingly, there arises another problem in that the recording paper is bent in the paper magazine. The above problems become more conspicuous when diameter of the recording paper roll becomes small as the recording paper is used.

SUMMARY OF THE INVENTION

In view of the foregoing, it is a primary object of the present invention to provide a paper magazine for containing a recording paper roll in which a top of a recording paper is properly advanced through a paper mouth.

It is a second object of the present invention to provide a paper magazine for containing a recording paper roll in which the recording paper roll is easily set in a printer or the like.

It is a third object of the present invention to provide a paper magazine for containing a recording paper roll in which a recording paper is properly advanced from beginning to end of the recording paper roll.

It is a fourth object of the present invention to provide a paper magazine for containing a recording paper roll in which a recording paper is prevented from being advanced at a slant and jamming.

It is a fifth object of the present invention to provide a paper magazine for containing a recording paper roll In which moisture retention property of a recording paper is improved.

In order to achieve the above and other objects, the paper magazine according to the present invention comprises a separating plate for separating the recording paper from the recording paper roll contained in the paper magazine. The separating plate is adapted to contact the periphery of the recording paper roll. Upon rotating the recording paper roll in a paper advancing direction, the separating plate peels a top of the recording paper from the recording paper roll, and leads it to a paper mouth through which the recording paper is advanced out of the paper magazine.

In a preferred embodiment, the separating plate is disposed behind the paper mouth and contacts the periphery of the recording paper roll with resilience. The paper magazine Is provided with a rod for rotating the recording paper roll. When the recording paper roll is rotated in the paper advancing direction by the rod, the separating plate peels the top of the recording paper from the recording paper roll within one rotation thereof. The separated recording paper is led to the paper mouth by the separating plate, and advanced to the outside of the paper magazine.

On the other hand, when the recording paper roll is rotated in a paper rewinding direction, the most outer recording paper of the recording paper roll is pressed to the adjacent inside recording paper by the separating plate. Accordingly, the recording paper roll is closely rewound without loosening.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 2:
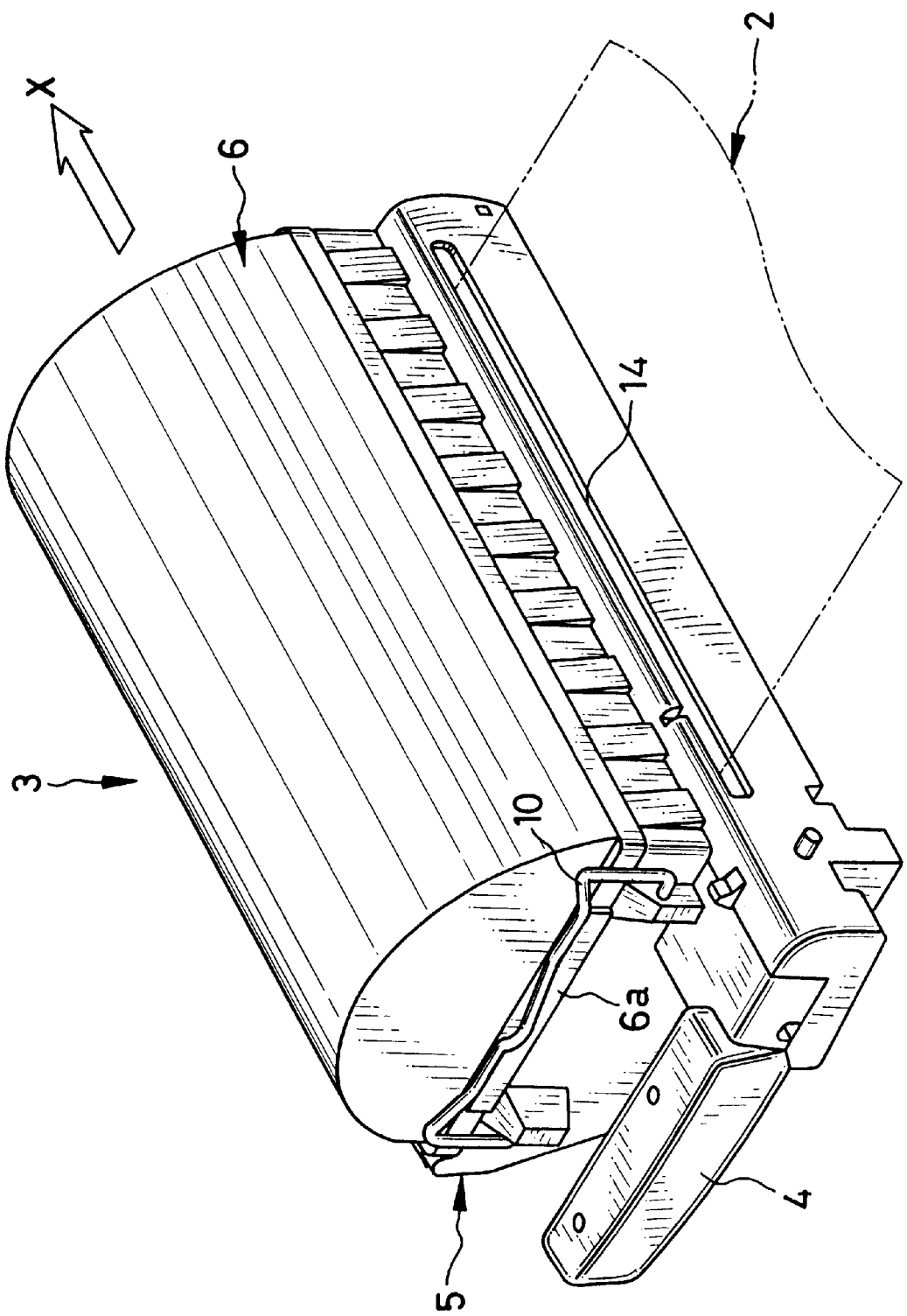
FIG. 2 is a perspective view showing an appearance of the paper magazine.

FIG. 2 is a perspective view showing an appearance of a paper magazine 3 containing a strip-like color thermal recording paper 2, and being set in a color thermal printer. The paper magazine 3 is substantially cylindrical so as to have similar shape to a recording paper roll constituted of the recording paper 2. The paper magazine 3 is set into the color thermal printer in a direction shown by an arrow X in FIG. 2, grasping a grip 4 provided at a side of the paper magazine 3. This paper magazine 3 is constituted of a magazine body 5 having a half-cylindrical shape, and a magazine lid 6. The magazine body 5 is formed from plastic having moisture retention property and light shielding property. The magazine lid 6 opens and closes the magazine body 5.

Figure 3:
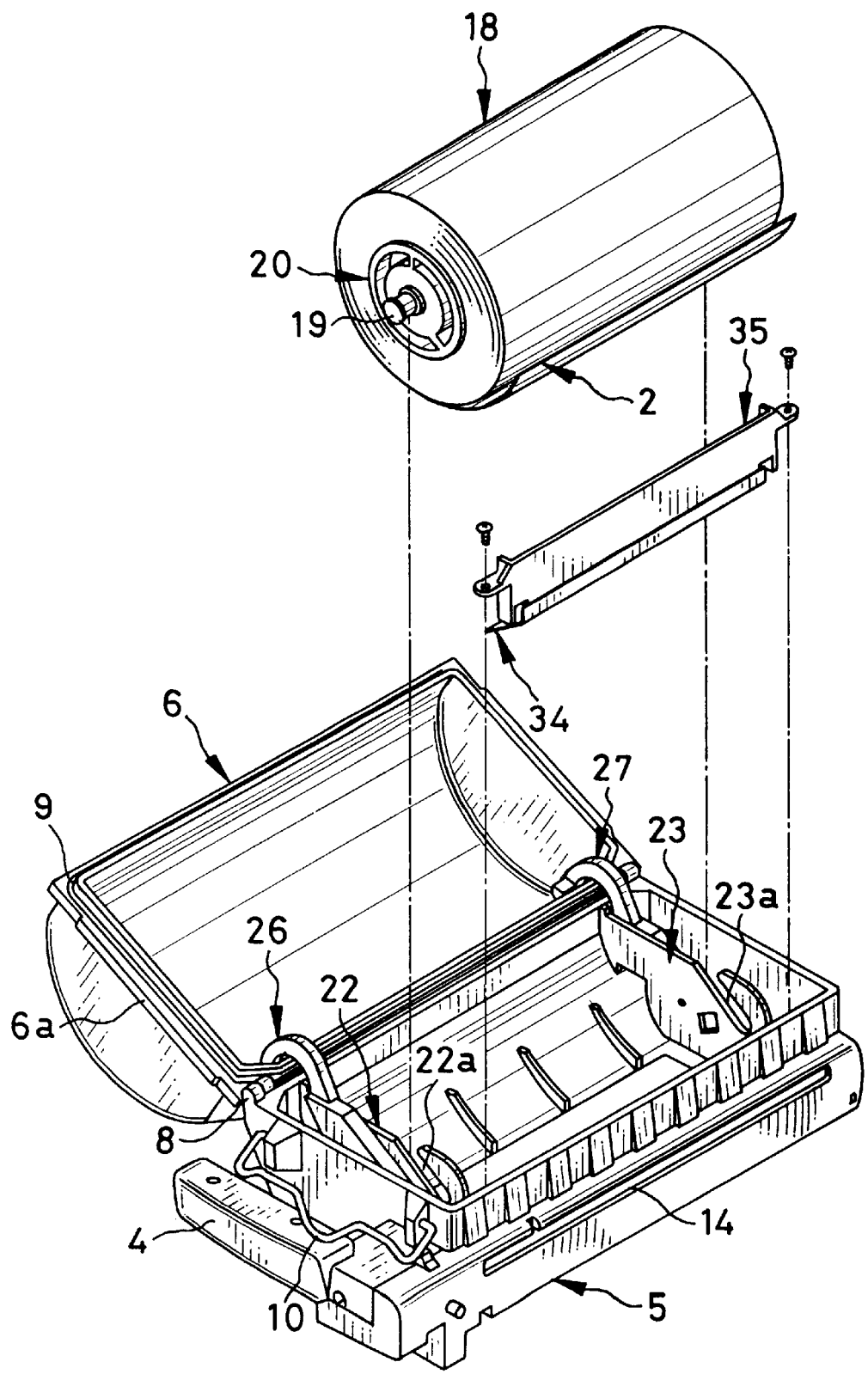
FIG. 3 is a perspective view of the paper magazine of which a magazine lid is opened.

As shown in FIG. 3 illustrating a state that the magazine lid 6 is opened, the magazine lid 6 is attached to the magazine body 5 via hinge 8 so as to be openable. A packing 9 is fitted to a peripheral edge of the magazine lid 6. The packing 9 keeps an inside of the paper magazine 3 in light-tight state, and prevents moisture and dust from entering the paper magazine 3. A lock member 10 formed by bending a wire is rotatably attached to each of both sides of the magazine body 5. As shown in FIG. 2, the lock member 10 engages with a protrusion 6a formed on both sides of the magazine lid 6 when the magazine lid 6 is closed. Accordingly, the magazine lid 6 is locked so as not to be carelessly opened.

Figure 1:
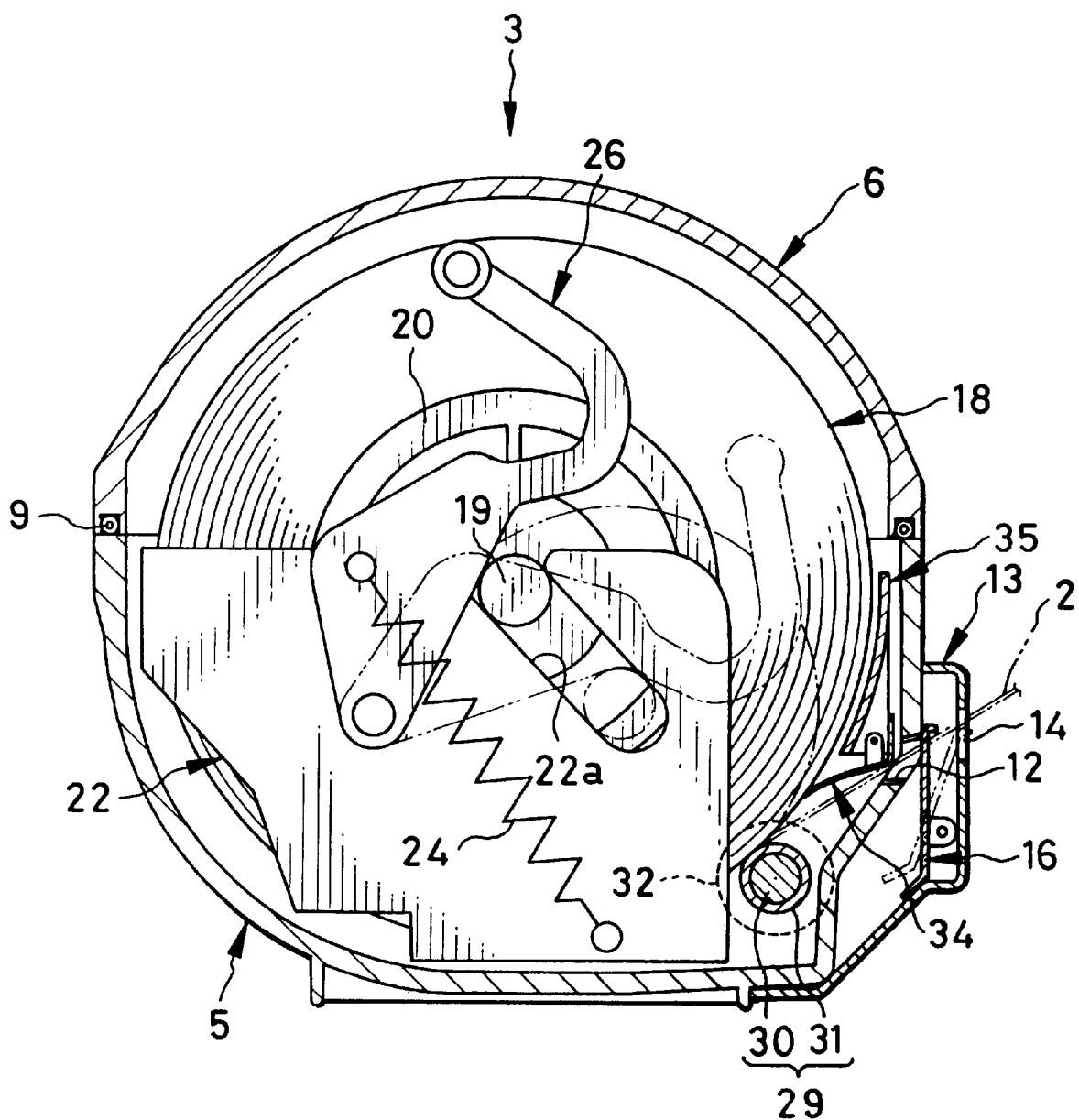
FIG. 1 is a sectional view showing a structure of a paper magazine for a recording paper roll according to the present invention.

As shown in FIG. 1 illustrating a sectional view of the paper magazine 3, a paper mouth 12 through which the recording paper 2 is taken out of the paper magazine 3 is formed in a front of the magazine body 5. Further, in front of the paper mouth 12 of the magazine body 5, a mouth protector 13 for protecting the paper mouth 12 is attached. The mouth protector 13 is provided with a paper passageway 14 through which the recording paper 2 passes.

A shutter plate 16 is attached to an inside of the mouth protector 13. The shutter plate 16 is swingable between a close position where the paper mouth 12 is light-tightly closed and an open position where the paper mouth 12 is opened as shown by two-dotted chain line in FIG. 1. The shutter plate 16 usually closes the paper mouth 12 by urging of a spring which is not shown. When the paper magazine is set into the color thermal printer, the shutter plate 16 is rotated by a shutter opening mechanism of the printer so that the paper mouth 12 is opened.

A recording paper roll 18 is formed such that the strip-like color thermal recording paper 2 is wound on a core (not shown) made of paper, plastic or the like. Before using the recording paper roll 18, it is contained in a package of a bag, a case or the like having the moisture retention property and the light shielding property. When the recording paper roll 18 is used, it is taken out of the package, and a disc-like flange 20 having a shaft 19 which projects on a center of the flange 20 is fitted to each of both ends of the core. After that, the recording paper roll 18 is contained in the paper magazine 3.

A pair of support plates 22 and 23 for rotatably supporting the recording paper roll 18 are provided in the magazine body 5. These support plates 22 and 23 are formed with grooves 22a and 23a respectively. The shafts 19 of the flanges 20 fitted to the both ends of the recording paper roll 18 are respectively inserted into the grooves 22a and 23a. Further, biasing members 26 and 27 are rotatably attached to the support plates 22 and 23. Each of the biasing members 26 and 27 abuts on the shaft 19 of the flange 20 due to urging of a spring 24, and pushes the shaft 19 along the grooves 22a and 23a of the support plates 22 and 23 to bias it to a predetermined position.

Further, a drive roller 29 is rotatably attached in the magazine body 5. The drive roller 29 abuts on the periphery of the recording paper roll 18 and rotates the recording paper roll 18 in a paper advancing direction and a paper rewinding direction. In this embodiment, the drive roller 29 is constituted of an iron rod 30 having a circle shape on its section, and a covering material 31 of rubber or the like for covering a surface of the rod 30. Owing to the covering material 31, the drive roller 29 is prevented from slipping. One end of the drive roller 29 projects to the outside of the magazine body 5, and a gear 32 is fixed to this projecting end. The gear 32 meshes with a drive mechanism of the color thermal printer when the paper magazine 3 is set in the printer.

The grooves 22a and 23a of the support plates 22 and 23 are formed so as to direct toward the drive roller 29. Thus, when the recording paper 2 is used and a diameter of the recording paper roll 18 becomes small, as shown by two-dotted chain line in FIG. 1, the shafts 19 are pushed with the biasing members 26 and 27 rotated by urging of the springs 24, and moved along the grooves 22a and 23a. Accordingly, the recording paper roll 18 is moved toward the drive roller 29 so that the periphery of the recording paper roll 18 always contacts the drive roller 29. Therefore, it is possible to rotate the recording paper roll 18 suitably from beginning to end thereof.

Behind the paper mouth 12, a separating plate 34 is disposed. The separating plate 34 contacts the periphery of the recording paper roll 18 with resilience. In other words, a lead portion of the separating plate 34 is urged toward the periphery of the recording paper roll 18. The separating plate 34 separates the top of the recording paper 2 from the periphery of the recording paper roll 18, and leads the separated top of the recording paper 2 to the paper mouth 12. The separating plate 34 is made of a material having resilience property. In this embodiment, the separating plate 34 is a thin plate of plastic. Further, the separating plate 34 is attached to a bracket 35 which is made of plastic and fixed to an inner wall of a front side of the magazine body 5.

Figure 4:
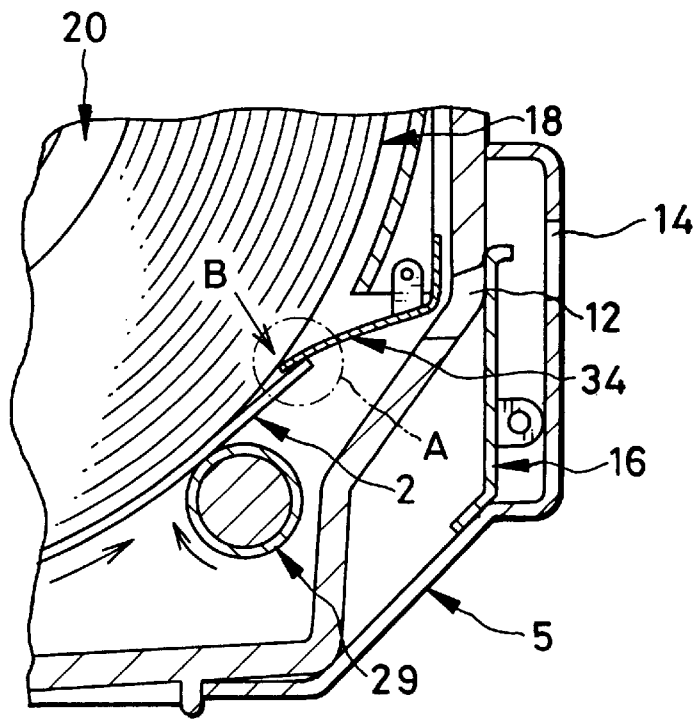
FIG. 4 is a partially sectional view of the paper magazine showing a top of a recording paper separated from the recording paper roll just after containing thereof.
Figure 5:
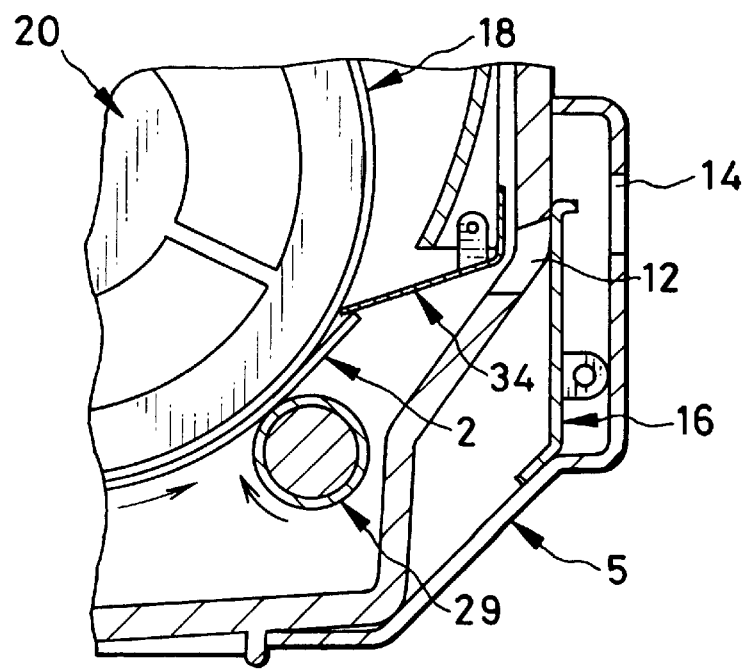
FIG. 5 is a partially sectional view of the paper magazine showing the top of the recording paper separated from the recording paper roll at time of ending thereof.

As shown in FIG. 4, when the diameter of the recording paper roll 18 is large, the separating plate 34 closely contacts the periphery of the recording paper roll 18 in a state that the separating plate 34 is flexed on the whole, and the separating plate 34 separates the top of the recording paper 2 from the periphery of the recording paper roll 18 rotated in the paper advancing direction (counterclockwise direction in FIG. 4) by means of the drive roller 29. Moreover, as shown in FIG. 5, when the diameter of the recording paper roll 18 becomes small, the separating plate 34 still contacts the periphery of the recording paper roll 18 closely owing to its resilience, and similarly, separates the top of the recording paper 2 from the recording paper roll 18. In such way, the separating plate 34 is capable of separating the top of the recording paper 2 properly without regard to the diameter of the recording paper roll 18. Further, since the separating plate 34 prevents the recording paper roll 18 from being wound loosely, the recording paper 2 is prevented from being advanced at a slant and jamming in the printer. Furthermore, dryness of the recording paper 2 is also prevented in the paper magazine 3.

Figure 6:
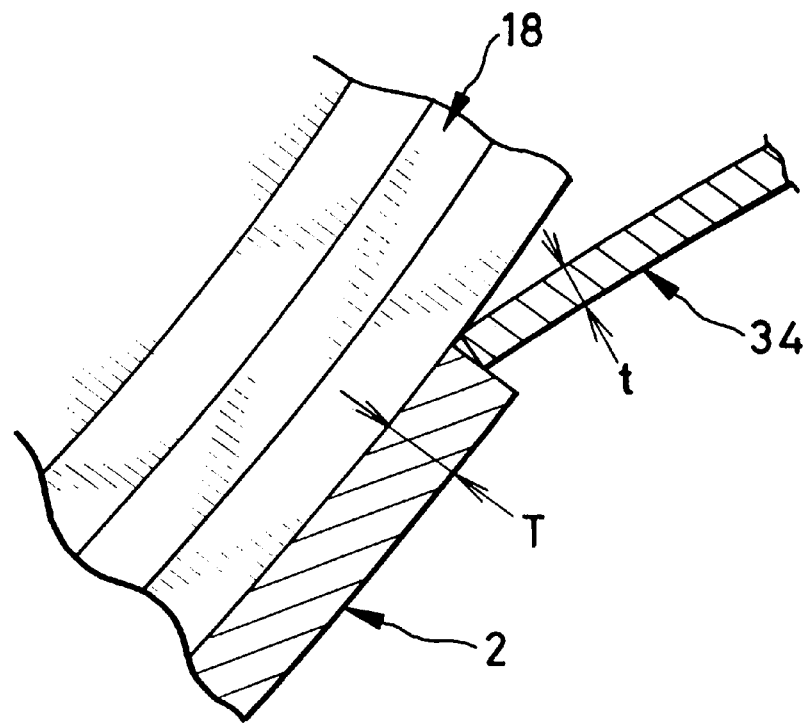
FIG. 6 is an enlarged view of a portion represented by a letter A in FIG. 4.

As shown in FIG. 6 which is an enlarged view of a portion represented by A in FIG. 4, thickness "t" of the separating plate 34 does not exceed half of thickness "T" of the recording paper 2, namely t<T/2. Thus, even if the top of the recording paper 2 contacts the periphery of the recording paper roll 18 closely, it is possible to separate the top of the recording paper 2 securely from the periphery of the recording paper roll 18.

Figure 7:
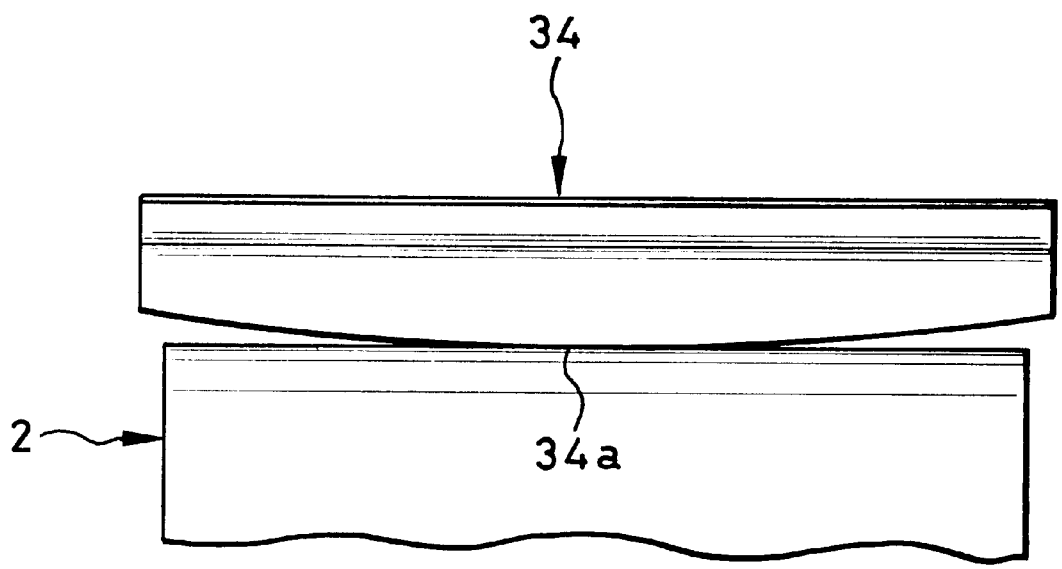
FIG. 7 is a perspective view taken in a direction of an arrow denoted by a letter B in FIG. 4.

As shown in FIG. 7 illustrating a perspective view taken in a direction represented by an arrow B in FIG. 4, the separating plate 34 has a width being longer than that of the recording paper 2 so that the separating plate 34 is capable of guiding the whole of the recording paper 2 relative to a width direction thereof. A lead portion 34a of the separating plate 34 is cut in an arc-like shape. By the way, the recording paper 2 is thick and has a certain degree of hardness. Accordingly, if the whole of the recording paper 2 relative to the width direction is separated from the recording paper roll 18 at once when the recording paper 2 contacts the periphery of the recording paper roll 18 closely, the separating plate 34 yields to the hardness of the recording paper 2 and is caused to be bent. However, by cutting the lead portion 34a of the separating plate 34 in the arc-like shape, it is possible to separate the recording paper 2 from the recording paper roll 18 at one point of the recording paper 2 in the width direction. Further, the separated point of the recording paper 2 is positioned at a center thereof relative to the width direction. In this case, the separating plate 34 does not yield to the hardness of the recording paper 2 and is capable of separating the recording paper 2 from the recording paper roll 18 properly.

Next, an operation of the above embodiment is described below. Before the recording paper roll 18 is set in the paper magazine 3, the lock member 10 is unfastened to open the magazine lid 6, and the biasing members 26 and 27 are swung to the magazine lid 6 side against the urging of the spring 24. Thus, the grooves 22a and 23a of the support plates 22 and 23 are opened.

The recording paper roll 18 is taken out of the bag having the moisture retention ability and the light shielding ability, and the flanges 20 are attached to the both ends of the core. The recording paper roll 18 is contained in the magazine body 5 so as to fit the shafts 19 of the flanges 20 into the grooves 22a and 23a of the support plates 22 and 23. After the recording paper roll 18 has been contained, the biasing members 26 and 27 are rotated to abut on the shafts 19 of the flanges 20. Successively, the magazine lid 6 is closed and locked with the lock members 10. The separating plate 34 in the magazine body 5 contacts the periphery of the recording paper roll 18 with resilience.

When the paper magazine 3 in which the recording paper roll 18 is contained is set in the color thermal printer, the drive mechanism of the printer meshes with the gear 32 coaxially fixed to the drive roller 29 of the paper magazine 3. Upon instruction of printing for the color thermal printer, preparation for the printing is carried out in the printer. During this preparation, the shutter opening mechanism of the printer rotates the shutter plate 16 of the paper magazine 3 to the open position. Moreover, the drive mechanism of the printer rotates the gear 32 of the paper magazine 3 in the clockwise direction in FIG. 1 to rotate the recording paper roll 18 abutting on the drive roller 29 in the counterclockwise direction in FIG. 1, namely in the paper advancing direction.

As shown in FIG. 4, the top of the recording paper 2 abuts on the lead portion 34a of the separating plate 34 within one rotation of the recording paper roll 18, and is separated from the periphery of the recording paper roll 18 at its central portion relative to the width direction. The recording paper 2 separated from the periphery of the recording paper roll 18 enters the paper mouth 12 along the separating plate 34, and is advanced from the paper passageway 14 to the outside of the paper magazine 3.

The recording paper 2 advanced from the paper magazine 3 is cut into a prescribed print size and discharged to the outside of the printer after a full color image has been thermally recorded on the recording paper by the color thermal printer. When printing is over, the drive mechanism of the color thermal printer rotates the gear 32 in the paper rewinding direction which is opposite to the paper advancing direction. Thus, the recording paper 2 is rewound in the paper magazine 3. At this time, the separating plate 34 presses air out of a space between the recording paper roll 18 and the recording paper 2 so as to wind the recording paper 2 closely. Accordingly, the recording paper 2 is prevented from drying.

Figure 8:
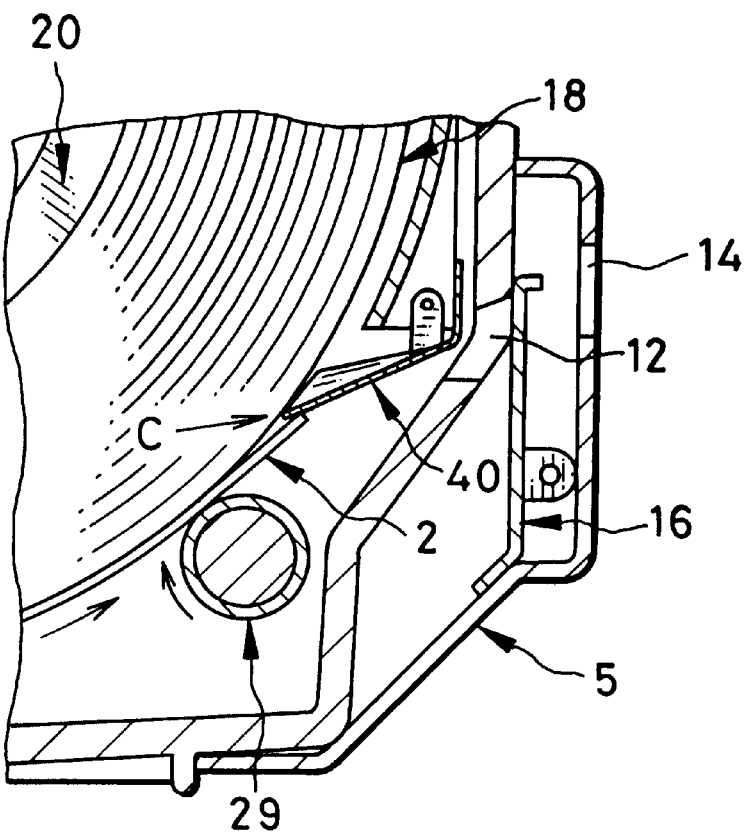
FIG. 8 is a partially sectional view of the paper magazine using a separating plate according to a second embodiment.
Figure 9:
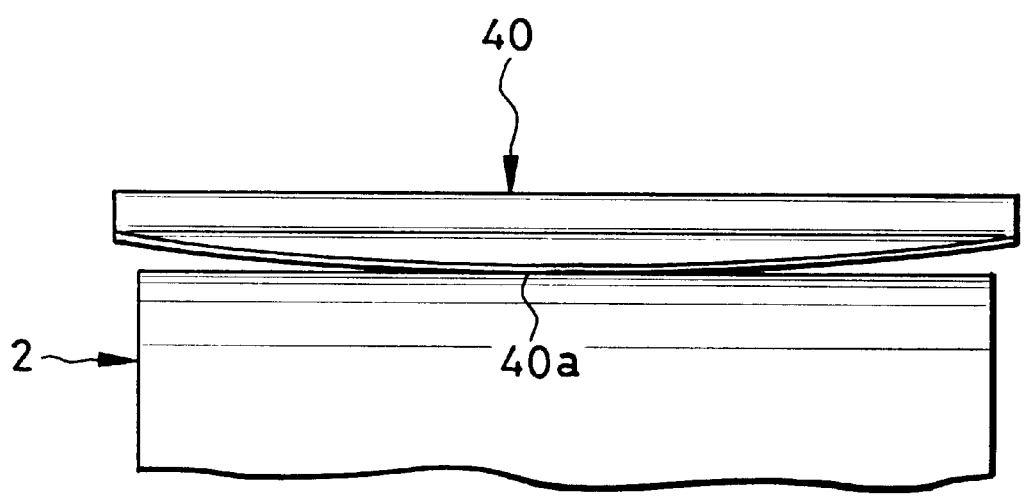
FIG. 9 is a perspective view taken in a direction of an arrow denoted by a letter C in FIG. 8.

FIGS. 8 and 9 show a second embodiment according to the present invention. FIG. 9 Illustrates a perspective view taken in a direction of an arrow denoted by C in FIG. 8. In the first embodiment, by employing the separating plate 40 having half thickness of the recording paper 2 or less, separation of the recording paper 2 from the recording paper roll 18 is improved. However, in this case, the separating plate 40 is inferior in durability because of its thin thickness so that the separating plate 40 is likely to become dull. In order to solve this problem, in the second embodiment, a lead portion 40a of a separating plate 40 is dented relative to a vertical direction. In other words, the lead portion 40a has an arc-like shape such as to hollow downward. Thus, even if the thickness of the separating plate 40 is same with that of the first embodiment, stiffness of the separating plate 40 is improved. Further, the durability thereof is also improved.

Figure 10:
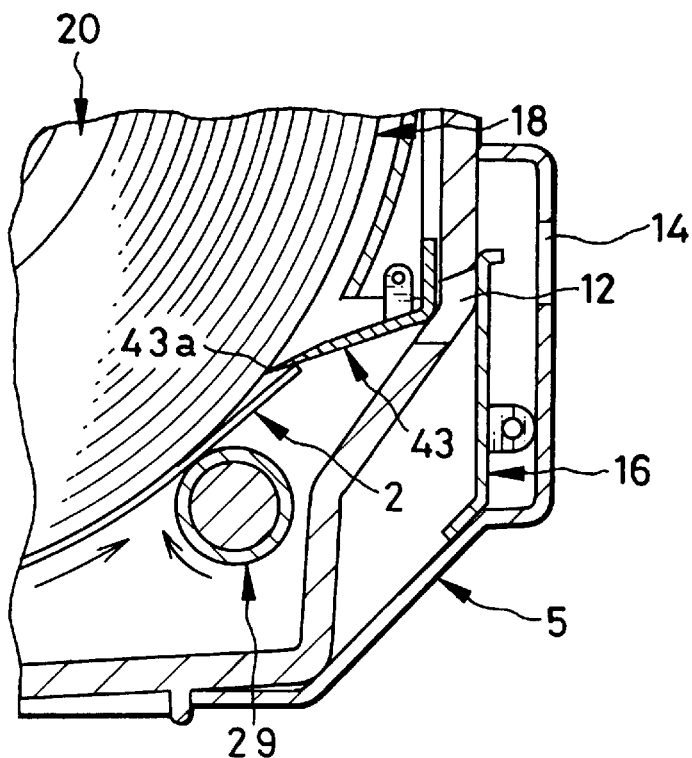
FIG. 10 is a partially sectional view of the paper magazine using the separating plate according to a third embodiment.
Figure 11:
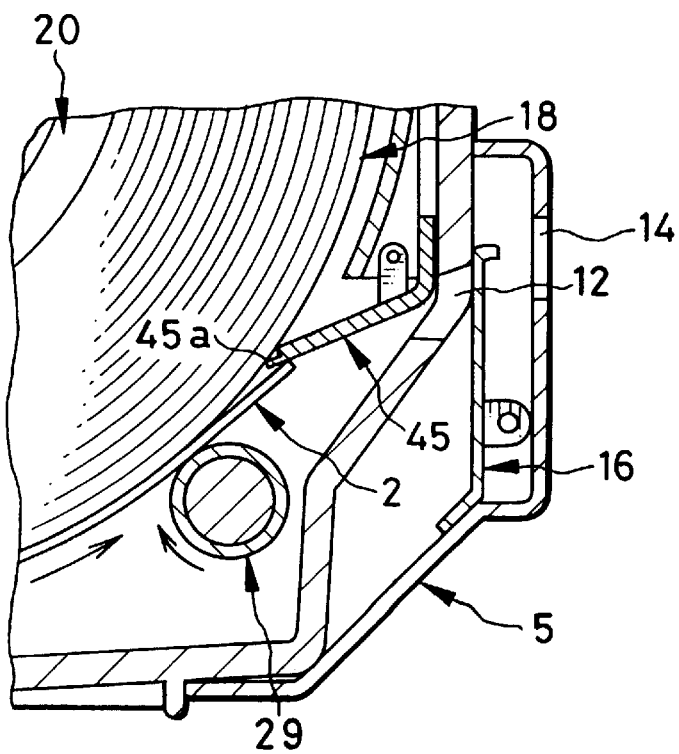
FIG. 11 is a partially sectional view of the paper magazine using the separating plate according to a fourth embodiment.

Other than the second embodiment in which the separating plate 40 is curved to improve its stiffness, as shown in FIG. 10 illustrating a third embodiment, it is possible to improve the durability of the separating plate without damaging its separation characteristics, although a root portion of the separating plate 43 is hard. In this case, a lead portion 43a of a separating plate 43 has an acute angle on its section. In other words, the separating plate 43 has a wedge shape on its section so as to become thicker toward the root portion thereof. Thus, the resilience is given to only the lead portion 43a. Further, as shown in FIG. 11 illustrating a fourth embodiment, a separating plate 45 may be provided with a step to vary thicknesses of a lead portion 45a and a root portion thereof. In this case, similar effect to the third embodiment is obtained.

Figure 12:
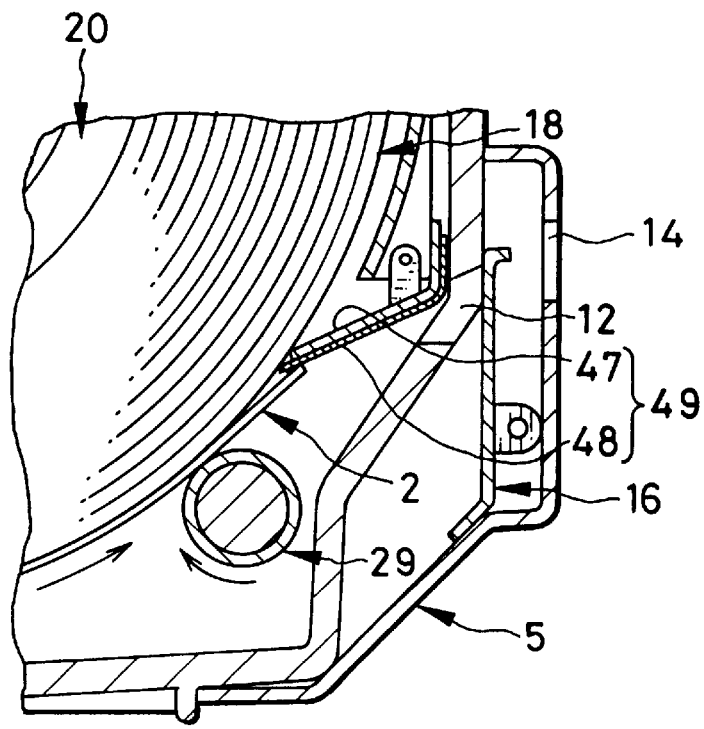
FIG. 12 is a partially sectional view of the paper magazine using the separating plate according to a fifth embodiment.

The step of the separating plate described in the fourth embodiment may be constituted such as shown in FIG. 12 illustrating a fifth embodiment. In this case, a separating plate 49 is constituted of two plates 47 and 48 which have different thickness and length, and are adhered each other. Similar effect to the above embodiments is obtained.

Figure 13:
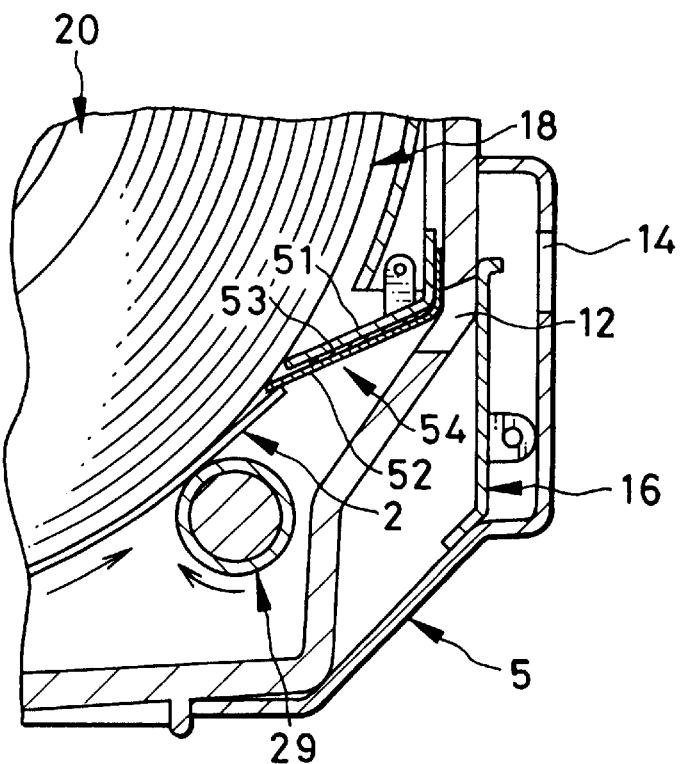
FIG. 13 is a partially sectional view of the paper magazine using the separating plate according to a sixth embodiment.

Further, as shown in FIG. 13 illustrating a sixth embodiment, a separating plate 54 may be provided with an adhesive layer 53 between two plates 51 and 52 having different thickness so as to form a gap at the lead portion of the separating plate 54. The adhesive layer 53 is a double-face tape, thickly applied adhesive, or the like. It is also possible to separate the top of the recording paper effectively with the separating plate 54. In the above embodiments, length of the thin lead portion of the separating plate is short so that its resilience is small, and the lead portions of the separating plates are likely to be broken because a stress is concentrated at the step portion. However, in this sixth embodiment, it is possible to have large resilience by elongating a free end of the thin plate 52. Further, owing to this resilience, it is possible to reduce the concentration of the stress.

In each of the above embodiments, the paper magazine supplies the color thermal recording paper to the color thermal printer. However, the present invention is available to the paper magazine in which a photographic paper or other recording paper roll is contained.

Figure 14:
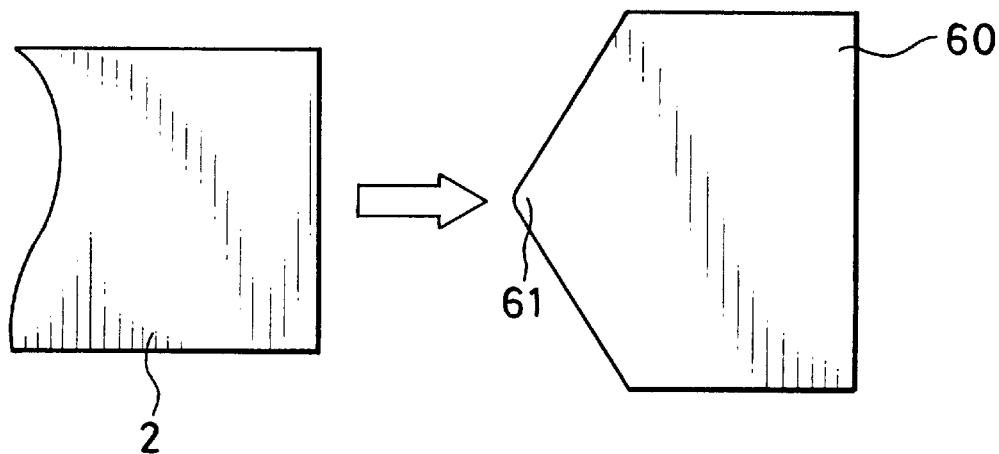
FIG. 14 is an explanatory illustration showing another preferable shape of the separating plate.
Figure 15:
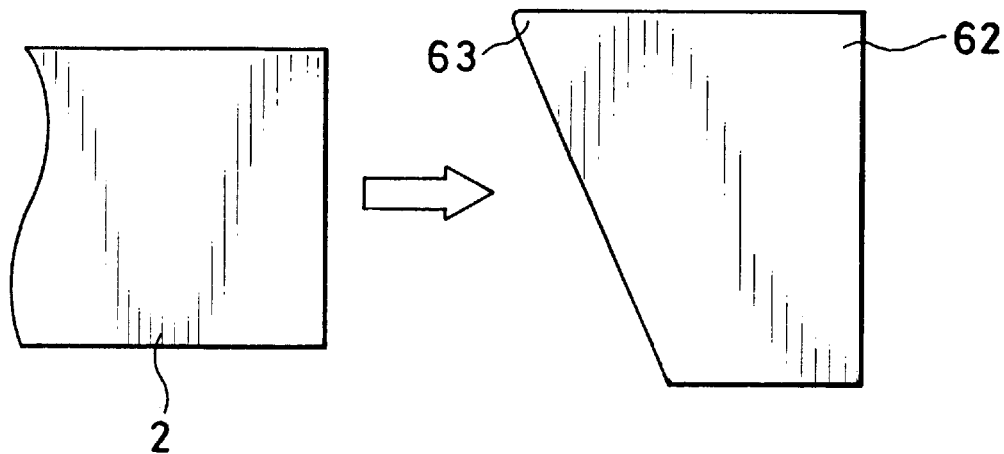
FIG. 15 is an explanatory illustration showing other preferable shape of the separating plate.
Figure 16:
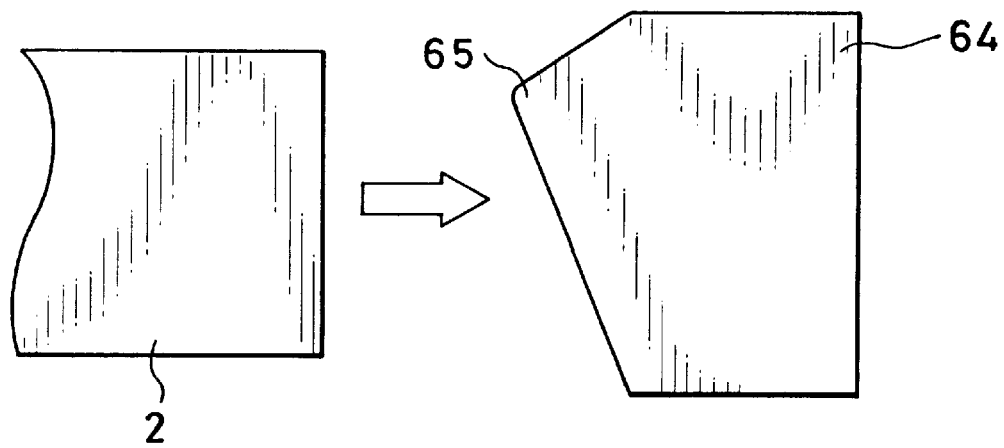
FIG. 16 is an explanatory illustration showing other preferable shape of the separating plate.

FIGS. 14 to 16 show other embodiments of the separating plate. In each of these embodiments, the recording paper 2 is adapted to be separated from one point relative to a width direction of the recording paper 2. As shown in FIG. 14, a separating plate 60 has a pointed part 61 located at the center of the separating plate 60 in the width direction. When the recording paper 2 is separated from the recording paper roll, the separating plate 60 contacts the top of the recording paper 2 at one point of its center. Thus, the recording paper 2 is separated from one point by the pointed part 61 of the separating plate 60. A separating plate 62 shown in FIG. 15 has a pointed part 63 located at a side portion of the separating plate 62. A separating plate 64 shown in FIG. 16 has a pointed part 65 located at a biased portion from the center toward the side portion of the separating plate 64. Each of the separating plates 62 and 64 also contacts the top of the recording paper 2 at one point. Accordingly, in each case, the recording paper 2 is separated from the one point at first.

In the above-described embodiments, the width of the separating plate is longer than that of the recording paper. However, the width of the separating plate may be same with or shorter than that of the recording paper.

As described above, according to the present invention, the recording paper is properly advanced from the paper magazine by using the separating plate, and the recording paper roll is easily set in a printer or the like. Moreover, since the separating plate has resilience, it is possible to cope with the change of the diameter of the recording paper roll, and to advance the recording paper in good condition from beginning to end of the recording paper roll. Further, the separating plate always contacts the periphery of the recording paper roll so that it is prevented to rewind the recording paper roll 18 loosely. Accordingly, it is possible to prevent the recording paper from being advanced at a slant and jamming while printing is carried out. Furthermore, the recording paper roll is closely rewound so that the moisture retention property of the recording paper is improved.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A paper magazine for containing a recording paper roll which includes a strip-like recording paper wound in a roll state, said paper magazine being provided with a paper mouth through which a top of said recording paper is advanced, and said recording paper roll being rotated in an advanced direction when said recording paper is advanced to an outside of said paper magazine and in a rewinding direction when said recording paper is rewound into said paper magazine, said paper magazine comprising:

a separating plate disposed near said paper mouth and contacting a periphery of said recording paper roll, when said recording paper roll is rotated in said advancing direction, said separating plate separates said top of said recording paper from said recording paper roll and leads said top to said paper mouth in order to advance said top out of said paper magazine, wherein said separating plate is made of a material having resilience.

2. A paper magazine according to claim 1, wherein a lead portion of said separating plate is urged toward said periphery of said recording paper roll.

3. A paper magazine according to claim 1, wherein said separating plate presses a most outer recording paper of said recording paper roll to an adjacent inside recording paper when said recording paper roll is rotated in said rewinding direction.

4. A paper magazine according to claim 1, wherein a width of said separating plate is same with or more than that of said recording paper.

5. A paper magazine according to claim 1, wherein said separating plate has a wedge shape on its section, and a thickness of said separating plate becomes thicker in proportion to a distance from said recording paper roll.

6. A paper magazine for containing a recording paper roll which includes a strip-like recording paper wound in a roll state, said paper magazine being provided with a paper mouth through which a top of said recording paper is advanced, and said recording paper roll being rotated in an advanced direction when said recording paper is advanced to an outside of said paper magazine and in a rewinding direction when said recording paper is rewound into said paper magazine, said paper magazine comprising:

a separating plate disposed near said paper mouth and contacting a periphery of said recording paper roll, when said recording paper roll is rotated in said advancing direction, said separating plate separates said top of said recording paper from said recording paper roll and leads said top to said paper mouth in order to advance said top out of said paper magazine, wherein a front edge of said separating plate has a half thickness of said recording paper or less.

7. A paper magazine for containing a recording paper roll which includes a strip-like recording paper wound in a roll state, said paper magazine being provided with a paper mouth through which a top of said recording paper is advanced, and said recording paper roll being rotated in an advanced direction when said recording paper is advanced to an outside of said paper magazine and in a rewinding direction when said recording paper is rewound into said paper magazine, said paper magazine comprising:

a separating plate disposed near said paper mouth and contacting a periphery of said recording paper roll, when said recording paper roll is rotated in said advancing direction, said separating plate separates said top of said recording paper from said recording paper roll and leads said top to said paper mouth in order to advance said top out of said paper magazine, wherein a lead portion of said separating plate has an arc-like shape in which a center of said lead portion protrudes.

8. A paper magazine according to claim 7, wherein said lead portion of said separating plate is curved in its width direction such that the whole of said lead portion contacts said periphery of said recording paper roll.

9. A paper magazine for containing a recording paper roll which includes a strip-like recording paper wound in a roll state, said paper magazine being provided with a paper mouth through which a top of said recording paper is advanced, and said recording paper roll being rotated in an advanced direction when said recording paper is advanced to an outside of said paper magazine and in a rewinding direction when said recording paper is rewound into said paper magazine, said paper magazine comprising:

a separating plate disposed near said paper mouth and contacting a periphery of said recording paper roll, when said recording paper roll is rotated in said advancing direction, said separating plate separates said top of said recording paper from said recording paper roll and leads said top to said paper mouth in order to advance said top out of said paper magazine, wherein said separating plate has a step-like shape on its section, and a thickness of said separating plate becomes thicker in portion to a distance from said recording paper roll.

10. A paper magazine for containing a recording paper roll which includes a strip-like recording paper wound in a roll state, said paper magazine being provided with a paper mouth through which a top of said recording paper is advanced, and said recording paper roll being rotated in an advanced direction when said recording paper is advanced to an outside of said paper magazine and in a rewinding direction when said recording paper is rewound into said paper magazine, said paper magazine comprising:

a separating plate disposed near said paper mouth and contacting a periphery of said recording paper roll, when said recording paper roll is rotated in said advancing direction, said separating plate separates said top of said recording paper from said recording paper roll and leads said top to said paper mouth in order to advance said top out of said paper magazine, wherein said separating plate is constituted of two plates, and said two plates overlap each other in a state that tips thereof are shifted.

11. A paper magazine according to claim 10, wherein said two plates have different thicknesses.

12. A paper magazine according to claim 10, wherein said two plates are overlapped via an adhesive layer.

13. A paper magazine according to claim 12, wherein said adhesive layer is provided except a front side between said two plates so as to form a gap at said front side.

14. A paper magazine for containing a recording paper roll which includes a strip-like recording paper wound in a roll state, said paper magazine being provided with a paper mouth through which a top of said recording paper is advanced, and said recording paper roll being rotated in an advanced direction when said recording paper is advanced to an outside of said paper magazine and in a rewinding direction when said recording paper is rewound into said paper magazine, said paper magazine comprising:

a separating plate disposed near said paper mouth and contacting a periphery of said recording paper roll, when said recording paper roll is rotated in said advancing direction, said separating plate separates said top of said recording paper from said recording paper roll and leads said top to said paper mouth in order to advance said top out of said paper magazine, wherein a lead portion of said separating plate has a pointed shape in which one part protrudes so as to separate said recording paper from one point corresponding to said protruding part.

15. A paper magazine according to claim 14, wherein said protruding part is positioned at a center of said separating plate.

16. A paper magazine according to claim 14, wherein said protruding part is positioned at a side of said separating plate.

17. A paper magazine according to claim 14, wherein said protruding part is positioned between a center and a side of said separating plate.

18. A paper magazine for containing a recording paper roll which includes a strip-like recording paper wound in a roll state, said paper magazine being provided with a paper mouth through which a top of said recording paper is advanced, and said recording paper roll being rotated in an advanced direction when said recording paper is advanced to an outside of said paper magazine and in a rewinding direction when said recording paper is rewound into said paper magazine, said paper magazine comprising:

a separating plate disposed near said paper mouth and contacting a periphery of said recording paper roll, when said recording paper roll is rotated in said advancing direction, said separating plate separates said top of said recording paper from said recording paper roll and leads said top to said paper mouth in order to advance said top out of said paper magazine;

a roller disposed at a position close to said separating plate so as to support a part of said periphery of said recording paper roll, said roller rotating said recording paper roll in said advancing direction or said rewinding direction;

a pair of grooves for receiving shafts of said recording paper roll, said grooves being elongated toward said roller; and a biasing member for pressing said shaft toward said roller.

19. A paper magazine according to claim 18, wherein said biasing member is rotatably attached to an inside of said paper magazine and urged by means of a spring.

20. A paper magazine according to claim 19, wherein said biasing members are provided at both sides of said recording paper roll.

21. A paper magazine according to claim 20, further comprising:

a bracket to which said separating plate is attached, said bracket being fixed to a back side of said paper mouth.

22. A paper magazine according to claim 21, wherein said recording paper is a color thermal recording paper or a photographic paper.

* * * * *